US012781131B2

(12) United States Patent
Kouris et al.

(10) Patent No.: US 12,781,131 B2
(45) Date of Patent: Nov. 3, 2026

(54) METHOD FOR OBTAINING A STABLE LIGNIN: POLAR ORGANIC SOLVENT COMPOSITION VIA MILD SOLVOLYTIC MODIFICATIONS

(71) Applicant: VERTORO B.V., Geleen (NL)

(72) Inventors: Panagiotis Kouris, Geleen (NL); Michael Dirk Boot, Geleen (NL); Emiel Jan Maria Hensen, Geleen (NL); Hendrik Oevering, Geleen (NL)

(73) Assignee: VERTORO B.V., Geleen (NL)

( * ) Notice: Subject to any disclaimer, the term of this patent is extended or adjusted under 35 U.S.C. 154(b) by 0 days.

(21) Appl. No.: 18/616,938

(22) Filed: Mar. 26, 2024

(65) Prior Publication Data

US 2024/0228886 A1 Jul. 11, 2024

Related U.S. Application Data

(62) Division of application No. 16/648,079, filed as application No. PCT/EP2018/075225 on Sep. 18, 2018, now Pat. No. 12,091,613.

(30) Foreign Application Priority Data

Sep. 18, 2017 (NL) ..................................... 2019567
Apr. 6, 2018 (EP) ..................................... 18166120

(51) Int. Cl.
*C10G 1/04* (2006.01)
*C07G 1/00* (2011.01)
(Continued)

(52) U.S. Cl.
CPC ............... *C10G 1/042* (2013.01); *C07G 1/00* (2013.01); *C08L 97/005* (2013.01); *C10G 1/083* (2013.01);
(Continued)

(58) Field of Classification Search
CPC ................................ C08L 97/005; C07C 1/00
See application file for complete search history.

(56) References Cited

U.S. PATENT DOCUMENTS 4,668,243 A * 5/1987 Schulz ..................... C10G 1/00 44/490
4,762,529 A * 8/1988 Schulz .................... C10L 1/231 44/490
(Continued)

FOREIGN PATENT DOCUMENTS

TW 201514190 A 4/2015
WO 2011117705 A2 9/2011
(Continued)

OTHER PUBLICATIONS

Liu et al. (Polymer Degradation and Stability 135, 2017, 54-60) (Year: 2017).*
(Continued)

*Primary Examiner* — Liam J Heincer
(74) *Attorney, Agent, or Firm* — Hudak, Shunk & Farine Co. LPA

(57) ABSTRACT

A process the production of a crude liquid lignin oil (CLO), the process includes the steps of providing a lignin-rich solid feedstock and subjecting the lignin-rich solid feedstock to a treatment in a polar organic solvent in the absence of an effective amount of added reaction promoter, such as a heterogeneous and/or homogeneous catalyst and/or hydrogen, and providing a lignin composition, the treatment includes a step of contacting the lignin-rich solid feedstock with a polar organic solvent under operating conditions of an operating temperature up to 210° C., an operating pressure lower than 50 bar and a residence time up to 240 minutes, wherein the ratio (w/v) of lignin (in lignin-rich feedstock) to
(Continued)

polar organic solvent ranges between 1:1.5 and 1:15, or between 1:2 and 1:10 or between 1:2 and 1:5.

11 Claims, 15 Drawing Sheets

(51) Int. Cl.
*C08L 97/00* (2006.01)
*C10G 1/08* (2006.01)
(52) U.S. Cl.
CPC .................. *C10G 2300/302* (2013.01); *C10G 2300/4006* (2013.01); *C10G 2300/4012* (2013.01)

(56) References Cited

U.S. PATENT DOCUMENTS 5,788,812 A * 8/1998 Agar ........................ D21C 3/20 162/37
6,180,845 B1 * 1/2001 Catallo ................... C10B 53/02 585/242
8,772,557 B2 * 7/2014 Chen ...................... C10G 1/065 585/14
2003/0100807 A1 5/2003 Shabtai et al.
2004/0192981 A1 * 9/2004 Appel ....................... B04B 5/12 202/262
2008/0050792 A1 * 2/2008 Zmierczak ............... C10G 3/50 435/161
2008/0083654 A1 * 4/2008 Server Barcelo ........ C10G 1/00 208/106
2009/0113787 A1 * 5/2009 Elliott ...................... C10G 1/06 44/308
2010/0159569 A1 * 6/2010 Medoff ..................... C12P 7/16 536/56
2011/0144396 A1 * 6/2011 Lotero ..................... C10G 1/02 585/240
2011/0313178 A1 * 12/2011 Sarkar ...................... C10K 3/04 568/799
2012/0144730 A1 * 6/2012 Stamires ................... C10L 9/02 44/307
2012/0190903 A1 * 7/2012 Server Barcelo ........ C10G 1/00 585/240
2012/0302796 A1 * 11/2012 Dhepe ................... C07C 51/093 568/309
2013/0055627 A1 * 3/2013 Vanderspurt ............ C10L 1/026 568/376
2013/0060071 A1 * 3/2013 Delledonne .............. C10G 3/50 585/310
2015/0361266 A1 * 12/2015 Samec ...................... C10L 1/02 252/406
2016/0137680 A1 * 5/2016 Thies ..................... B01D 11/00 530/507
2016/0312029 A1 * 10/2016 Samec .................... C10L 1/026
2017/0044328 A1 * 2/2017 Balakshin ................ C07G 1/00
2017/0152278 A1 * 6/2017 Samec ..................... C08H 6/00
2017/0253740 A1 * 9/2017 Murai ...................... C07G 1/00
2017/0298192 A1 * 10/2017 Samec ................. C09J 197/005
2017/0349617 A1 * 12/2017 Sun ......................... C12P 19/02
2018/0002607 A1 * 1/2018 Bachmann Nielsen .................... C10G 1/042
2018/0022877 A1 * 1/2018 Brown ..................... C08H 6/00 530/502
2018/0142088 A1 * 5/2018 Kawamoto ........... C08L 97/005
2018/0179339 A1 * 6/2018 Wikberg .................. C08H 6/00
2018/0215878 A1 * 8/2018 Okano ..................... C08G 8/20
2018/0265794 A1 * 9/2018 Dahlstrand .............. C10G 3/50
2018/0371252 A1 * 12/2018 Carrick ................. C08L 97/005
2019/0359893 A1 * 11/2019 Mandan .................... C07C 1/00
2019/0382959 A1 * 12/2019 Bergmark .............. D21H 17/33
2020/0014883 A1 1/2020 Fang et al.
2020/0079960 A1 * 3/2020 Zafar ................... C09J 197/005
2020/0148835 A1 * 5/2020 Paleologou .............. C08H 6/00

FOREIGN PATENT DOCUMENTS

WO 2013124459 A2 8/2013
WO 2014063852 A1 5/2014
WO 2016113280 A1 7/2016

OTHER PUBLICATIONS

Kim, J. et al., Effects of various reaction parameters on solvolytical depolymerization of lignin in sub- and supercritical ethanol, Chemosphere, 2013, vol. 93, No. 9, pp. 1755-1764, Elsevier Ltd.
Cheng, S. et al., Highly Efficient Liquefaction of Woody Biomass in Hot-Compressed Alcohol-Water Co-solvents +, Energy & Fuels, 2010, vol. 24, No. 9, pp. 4659-4667, XP055263677, American Chemical Society.
Cheng, S. et al., Hydrothermal degradation of alkali lignin to bio-phenolic compounds in sub/supercritical ethanol and water-ethanol co-solvent, Polymer Degradation and Stability, 2012, vol. 97, No. 6, pp. 830-848, Elsevier Ltd.
Ye, Y. et al., Novel Method for Production of Phenolics by Combining Lignin Extraction with Lignin Depolymerization in Aqueous Ethanol, Industrial & Engineering Chemistry Research, 2012, vol. 51, No. 1, pp. 103-110, ACS Publications, American Chemical Society.
De Wild, P. et al., Organosolv fractionation of lignocellulosic biomass for an integrated biorefinery, NPT Processtechnology, 2015, pp. 10-11, XP055514746, https://www.ecn.nl/publications/PdfFetch.aspx?nr=ECN-V--14-010.
De La Torre, M. et al., Organosolv lignin for biofuel, Industrial Crops and Products, 2013, vol. 45, pp. 58-63, Elsevier B.V.
Schulze, P. et al., Advanced process for precipitation of lignin from ethanol organosolv spent liquors, Bioresource Technology, 2015, vol. 199, pp. 128-134, XP055514690, Elsevier Ltd.
McDonough (The Chemistry of Organosolv Delignification, IPST Technical Paper Series, No. 455, 1992) (Year: 1992).
Luo et al., Recent Progress in microwave-assisted lignin conversion, Renewable and Sustainable Energy Reviews, May 19, 2025, pp. 1-22, Elsevier.

* cited by examiner

METHOD FOR OBTAINING A STABLE LIGNIN: POLAR ORGANIC SOLVENT COMPOSITION VIA MILD SOLVOLYTIC MODIFICATIONS

FIELD OF THE INVENTION

The present invention relates to a process for the production of a liquid lignin composition, more specifically a method for obtaining a stable lignin: polar organic solvent composition via mild solvolytic modifications. In addition, the present invention relates to a crude lignin oil (CLO) obtained according to such a method. The present invention also relates to the use of crude lignin oil (CLO) thus obtained.

BACKGROUND OF THE INVENTION

Lignin is a product which is not utilized to its full potential nowadays. The status quo in biomass valorization dates back nearly two millennia to ancient China around 105 A.D. It was then and there that the art of paper manufacturing was first recorded. In paper making, and more recently in cellulosic ethanol production, the lignocellulose matrix is separated into (hemi) cellulose and lignin. The former compound is valorized to paper or ethanol, while the latter is burnt on site for energy.

This basic concept of sacrificing of lignin in favor of extracting value from cellulose has been the norm for nearly two millennia. Even today, over 98% of all lignin thus produced is destined to be burnt to service plant energy needs. This low value application for lignin constitutes the first problem to be solved. This is a shame given that there is ample scientific evidence that lignin can directly replace valuable polar hydrocarbons in various applications, ranging from resins to foams to sunscreen.

These lignin applications are a result of natural evolution. The earliest unequivocal fossil evidence suggests that the first terrestrial flora arose 450 million years ago. These pioneering land plants soon after confronted with various major challenges, including exposure to damaging UV-B radiation from which water had protected their ancestors, lack of structural support once provided by buoyancy, desiccation (i.e., state of extreme dryness) stress and, eventually, co-evolving herbivores and pathogens.

These new threats were eventually overcome when plants evolved the ability to incorporate lignin, a phenylpropanoid polymer, into their cell walls, thereby creating the lignocellulose matrix that is the principal building block of nearly all terrestrial flora.

Another, at first glance unrelated issue, is that hundreds of million tons per year of polar hydrocarbons (e.g., methanol, ethanol, phenol, diols) are currently produced from fossil oil in greenhouse gas intensive refineries to produce aforementioned applications. This unsustainable process constitutes the second problem to be solved.

The production of 2nd generation (2G) bioethanol in cellulosic ethanol plants, includes the conversion of lignocellulosic biomass to a sustainable liquid fuel. Although other components of woody biomass can be broken down into sugars and subsequently converted to a range of liquid biofuels, lignin, which comprises up to 30 wt. % of the plant biomass, is more difficult to break down into high-value chemicals and fuels. Most of the biorefinery layouts based on biochemical upgrading of the glucose part of biomass are considering lignin as a waste. The heating value is then recovered by its combustion onsite in order to meet the plant's process heat and power needs, with excess of electricity being exported to the grid.

Another way to add value to lignin valorisation research targets also base and fine chemicals production onsite. However, such processes often deliver low yields of specific compounds and require difficult and expensive separation techniques. Another approach is to use the heterogeneous nature of the lignin polymer in reductive depolymerisation techniques as a path towards fuels. This often involves expensive catalysts, hydrogen for sufficient deoxygenation and harsh process conditions for effective cracking of lignin. In these conditions, secondary reactions are also taking place and are responsible for high solvent consumption which leads to a non-economically feasible process. Additionally, in second generation bioethanol plants the production ratio of lignin to bioethanol is within the range of 0.5 to 0.3, which means that the lignin:solvent mixing ratio for producing a stable crude lignin oil (CLO) is a crucial parameter for designing an economically feasible continuous process and avoiding additional ethanol supply in the plant.

The article "Effects of various reaction parameters on solvolytical depolymerisation of lignin in sub- and supercritical ethanol, Choi et al., 2013; Chemosphere 93; 1755-1764" relates to the treatment of lignin with ethanol at sub/supercritical temperatures (200, 275, and 350° C.) for conversion to low molecular phenols under different reaction times (20, 40, and 60 min), solvent-to lignin ratios (between 50 and 150 ml/gram lignin) and initial hydrogen gas pressures (2 and 3 MPa). Essential lignin-degraded products, oil (liquid), char (solid), and gas were obtained, and their yields were directly influenced by reaction conditions. In particular, concurrent reactions involving depolymerisation and recondensation as well as further (secondary) decomposition were significantly accelerated with increasing temperature, leading to both lignin-derived phenols in the oil fraction and undesirable products (char and gas).

United States Patent Application Publication US 2003/0100807 relates to a process for converting a lignocellulose biomass into a blending component for a petroleum-derived fuel comprising extracting a lignin-containing fraction in water as a reaction medium from the lignocellulose biomass to provide a lignin feed material, depolymerizing the lignin feed material in an aqueous solvent comprising a CsX-type zeolite catalyst at an operational temperature of from about 300° C. to about 340° C. to provide a first composition comprising a depolymerized lignin; and hydroprocessing the first composition to provide a second composition comprising an aromatic hydrocarbon, wherein the second composition provides a blending component for a petroleum or petroleum-derived fuel.

International application WO 2016/113280 relates to lignin-derived liquid fuels, i.e. oils that are soluble in diesel fuels, and to methods of their production. Residual lignin from a lignocellulosic biomass refinery process is subject to treatment in supercritical ethanol, propanol or butanol, under conditions sufficient to provide a combustible oil that is significantly soluble in diesel and marine diesel oil, without reliance on added reactions promoters such as catalysts, acids, bases or hydrogen gas ($H_2$). In more detail, International application WO 2016/113280 discloses a process for production of liquid lignin fuel comprising the steps of: providing lignin-rich solid residual from lignocellulosic biomass feedstock that has been hydrothermally pre-treated and subsequently subjected to cellulase enzyme hydrolysis, subjecting the lignin-rich solid residual to treatment in supercritical ethanol, propanol or butanol in the absence of an effective amount of added reaction promoter; and recovering liquid product from the alcohol reaction mixture as a mixture of heavy liquid fraction having boiling point above 120° C. and one or more light fractions having boiling point beneath 120° C., wherein the water content for the treatment is within the range 0 to 8 wt. %, the ratio of solid to solvent for the treatment is within the range 0.02 to 0.43, the temperature for the treatment is within the range 325 to 425° C. and the reaction period for the treatment is within the range 5 minutes to 2 hours to produce a heavy liquid fraction having O:C ratio of 0.20 or less.

International application WO 2014/063852 relates to a process that converts a lignin feedstock to a lignin product comprised of aromatic compounds, the process comprising the step of exposing the converted lignin feedstock to at least one catalyst in the presence of a plurality of hydrogen donor molecules at a reaction temperature in the range of 190° C. to 350° C. for a reaction time of at least 30 minutes, wherein the converted lignin feedstock comprises phenol oil, and at least some of the plurality of hydrogen donor molecules are donated during the exposure of the converted lignin feedstock and the plurality of hydrogen donor molecules to the at least one catalyst at the reaction temperature during the reaction time wherein the at least one catalyst comprises an elemental metal. The first catalyst comprises a metal selected from the group consisting of platinum, palladium, cesium, copper, nickel, ruthenium, rhodium, gold, iron, cobalt and iridium.

International application WO 2013/124459 relates to a method for separating lignin conversion products from catalyst particles during a continuous catalytic conversion of a lignin feedstock to lignin conversion products comprising the steps of conducting the continuous catalytic conversion of the lignin feedstock to the lignin conversion products in the presence of free catalyst particles in a lignin conversion reactor, with the lignin conversion reactor having a liquid phase and a gas phase with a liquid level at the interface between the liquid phase and the gas phase and removing the lignin conversion products from the lignin conversion reactor at a lignin conversion products removal velocity at a point in the lignin conversion reactor which is higher relative to gravity than the liquid level of the lignin conversion reactor wherein the lignin conversion products removal velocity is less than a settling velocity of the catalyst particles.

International application WO 2011/117705 relates to a process for the conversion of lignin to liquid hydrocarbons, comprising subjecting the lignin to hydrogenolysis in the presence of at least one hydrogenolysis catalyst, at a temperature ranging from 250° C. to 350° C., so as to obtain depolymerized lignin and subjecting said depolymerized lignin to hydrotreating so as to obtain a mixture of liquid hydrocarbons, wherein the hydrogenolysis catalyst is a supported catalyst having a metal selected from palladium, ruthenium, platinum and nickel.

US2016/0137680 describes a method to obtain a purified lignin by treating lignocellulosic biomass with a mixture of water and acetic acid at elevated temperatures, giving a solvent-rich liquid phase and a lignin-rich liquid phase.

In view of the anticipated increasing demand for cleaner and environmentally friendly transportation fuels, it is highly desirable to develop alternative technologies for producing diesel-range aromatic hydrocarbons from alternative, abundant sources other than petroleum. To this direction, it is highly relevant that biorefinery lignin in particular provides a potential substrate for production of sulfur-free biofuels as environmental demands for low sulfur emissions from ships in coastal areas are increasing.

SUMMARY OF THE INVENTION

An object of the present invention is thus to provide an economically feasible way to send lignin offsite and create a potential feedstock for the fuel market or the chemical sector.

Another object of the present invention is to remove the logistical inconvenience that is caused by transportation of solid lignin.

Another object of the present invention is to provide a method for producing a lignin composition, wherein the lignin composition can be transported as a stable liquid suspension with reversible functionality. The lignin can be obtained again in its solid form after removing the solvent from the lignin composition.

The present invention thus relates to a process for the production of a crude liquid lignin oil (CLO), said process comprises the steps of providing a lignin-rich solid feedstock and subjecting the lignin-rich solid feedstock to a treatment in a polar organic solvent in the absence of an effective amount of added reaction promoter, such as a heterogeneous and/or homogeneous catalyst and/or hydrogen, and providing a lignin composition, said treatment comprises a step of contacting said lignin-rich solid feedstock with a polar organic solvent under operating conditions of an operating temperature up to 210° C., an operating pressure lower than 50 bar and a residence time up to 240 minutes, wherein the feeding ratio (w/v) of lignin (present in the lignin-rich solid feedstock) to polar organic solvent ranges between 1:1.5 and 1:15.

It has been surprisingly found that in the process according to the present invention a mild depolymerisation can take place, with a minimum amount of char formation and a high amount of lignin solubilized in the polar organic solvent.

The inventors found that only through this specific process CLO products can be obtained having a very high lignin content.

In the solvolysis reaction according to the present invention, lignin is solubilized by means of and in a polar hydrocarbon to form a stable crude lignin oil or CLO. CLO is thus essentially a blend of both products. By tuning the process conditions, the ratio between these CLO constituents can be controlled.

In other words, the biobased content of aforementioned downstream applications can be tuned, thereby effectively reducing the need for fossil oil, whereby the polar hydrocarbon of choice depends on the targeted application. For example, indeed a partially biobased marine fuel is pursued, methanol would be selected. When opting for phenolic resins or polyurethane, phenol or diols would be used respectively.

What fundamentally sets the approach of the present invention apart from more conventional lignin valorization strategies, is that lignin is not converted into polar hydrocarbons, which would otherwise involve complex and expensive chemistry, typically characterized by high temperatures and pressures, along with the use of heterogeneous and/or homogenous catalysts. Rather, said hydrocarbons are replaced partially by lignin.

A second major distinction in the approach of the present invention is that there is no attempt to use lignin directly in aforementioned high-value applications, which would otherwise result in a logistical nightmare. For one, lignin would have to be shipped as a solid rather than a liquid. To compound matters further, solid lignin would have to be sourced and transported from multiple sites in order to achieve a reasonable economy of scale.

A fortunate consequence of these strategic decisions is that the process according to the present invention is both comparatively mild (i.e., relatively low CAPEX and OPEX), far more versatile in terms of possible product-market combinations, and considerable more logistically viable than competing approaches to lignin valorization. Needless to say, these favorable attributes would be beneficial to any business case.

The invention further relates to a lignin composition (or a crude liquid lignin oil), which has a high lignin content and is stable.

The invention also relates to the use of the lignin composition, for example as a fuel or as a chemical component, for example a platform chemical rich in aromatic units.

DETAILED DESCRIPTION

The lignin preferably used in the process according to the present invention is a lignin from a biorefinery source. The crude product to be used can have water, an organic fraction and an inorganic fraction. The organic fraction typically has at least 40 wt. % lignin. Preferably the lignin comes from a 2G bioethanol plant.

One or more of the aforementioned objects can be obtained by the present method. In the first stage of the present process, lignin-rich solid feedstock is dispersed in a polar organic solvent and subjected to a mild depolymerisation process to produce a crude liquid lignin oil (CLO). In order to transform initially the lignin-rich solid feedstock to lignin composition, for example for use as a liquid chemical intermediate, a simplified approach involves cleavage of the weak ether linkages and break down of lignin into lower molecular weight oligomers. Ether linkages are more readily to be cleaved due to the lower bond enthalpy compared to the C—C linkages. The cleavage of lignin inter linkages in subcritical polar organic solvent conditions is believed to be the cause for partial depolymerisation. The relative yield of the depolymerized lignin components (monomers or oligomers) can be controlled by selecting a suitable set of process conditions for this first step. The key parameters of this process are temperature, residence time, lignin to solvent ratio and pressure.

Preferably the operating temperature ranges between 100-210° C., preferably between 140-205° C., between 150 and 200° C., more preferably in a range of 160-199° C.

Preferably the operating pressure ranges between 2-50 bar, preferably in a range of 5-40 bar.

Preferably the residence time ranges between 10-120 minutes, preferably in a range of 20-90 minutes, more preferably between 21 and 40 minutes.

The polar solvent can in principle be any solvent which can make a stable lignin composition with a (partially depolymerized) lignin. Preferably the polar organic solvent is a polar organic solvent having at least one oxygen group. The polar organic solvent having at least one oxygen group is preferably chosen from the group of alcohols, ketones and esters, and combinations thereof. Examples of suitable alcohols are aliphatic alcohols, aromatic alcohols (like phenols) and multifunctional alcohols, for example diols. The melting temperature of the solvent is preferably lower than 50° C. more preferably lower than 40° C.

The polar organic solvent having at least one oxygen group is preferably chosen from the group of methanol, ethanol, n-propanol, i-propanol, t-butanol, i-butanol, phenol, diols, like for example ethylene glycol, diethylene glycol, triethylene glycol, tetraethylene glycol, propylene glycol, dipropylene glycol, tripropylene glycol, 1,3-propanediol, butanediol, hexanediol, glycerol, methyl acetate, ethyl acetate, acetone and methyl ethyl ketone, and combinations thereof.

Most preferably the polar organic solvent is chosen from ethanol, methanol, diol, phenol or mixtures of these.

In the process according to the invention, some water can be present in addition to the polar organic solvent. Water can come from the lignin, or be dissolved in the polar solvent (for example as an azeotropic mixture with ethanol). Typically the amount of water is less than 25 wt. %, preferably less than 15 wt. %, more preferably less than 10 wt. % of the sum of the lignin-rich solid feedstock and polar organic solvent.

In a preferred embodiment first a lignin suspension is prepared in a solvent chosen from ethanol, methanol or mixtures thereof, after which the solvent (ethanol and/or methanol) can be (at least partially) replaced by a different polar organic solvent having at least one oxygen group.

Surprisingly the ratio of lignin to organic solvent can be very high in the process according to the invention. This means that the amount of solvent used to dissolve the solid lignin is low compared to processes of the prior art. Preferably the lignin-rich solid feedstock (mass):polar organic solvent (volume) ratio is between 1:2 and 1:10. This ratio refers to the starting mixing ratio of lignin with the polar organic solvent, before reaction (first stage). Preferably the ratio of lignin to polar organic solvent ranges between 1:2 and 1:5, especially in the case that the organic solvent is chosen from ethanol and/or methanol.

The present process comprises thus a method for creating a reversible lignin composition (the crude liquid lignin oil, CLO) by means of mild solvolytic chemical modifications wherein lignin is solubilized in a polar organic solvent in specific ratio and can be transported in liquid form to centralized biorefinery locations. In these central spots, different lignin feedstocks can be further depolymerized catalytically to produce higher added value biobased chemicals or return to its initial solid form and serve as a biobased material (e.g. adhesives, asphalt substrates). The lignin composition is reversible, which means that the solvent can be removed completely resulting in a solid lignin which closely resembles the original lignin-rich feedstock.

In the present description the term "ratio" is always based on a w/v ratio, i.e. weight per volume: it is expressed as the grams of lignin or lignin fragments which are dissolved in 1 ml solvent. The ratio is measured at 25° C. For example a ratio of 1:2 means that 1 gram of lignin is dissolved in 2 ml of solvent.

The present invention provides a low energy consumption method for onsite production of a medium crude lignin oil composition (CLO-M) composed of lignin and a polar organic solvent in 1:10 to 1:5 w/v ratio and after distillation of excess solvent a heavy crude lignin oil composition (CLO-H) composed of lignin and a polar organic solvent in 1:2 to 1:0.3 w/v ratio. This method is focusing on introducing the maximum amount of lignin into the polar organic solvent (for example ethanol and/or methanol) at low temperatures in order to increase not only the yield of lignin leaving the 2G plant but also the yields of the produced composition. Low operational temperature at the first stage ensures the minimum loss of organic (for example ethanol and/or methanol) solvent which are the key for maintaining the techno-economic feasibility. Any ethanol or methanol conversion onsite, together with high ethanol/methanol concentration in the lignin-solvent mixture would require additional supply of 1G or 2G bioethanol or methanol. The present invention provides a gentle method which indirectly makes use the minimum amount of solvent in order to create a stable lignin composition.

In a preferred embodiment the reaction mixture, obtained after solvolyse of the lignin-rich solid feedstock, is subjected to a solid/liquid separation step for obtaining a liquid phase and a solid phase. The liquid phase is the CLO-M (lignin composition), while the solid phase is comprising undissolved products from the lignin-rich solid feedstock.

In a second stage of the present process, the medium crude lignin oil (CLO-M) obtained from the previous step can be subjected to a gentle partial removal of the polar organic solvent from the mixture, for example by distillation, thereby producing a heavy crude lignin oil (CLO-H) with a mixing ratio approximately equal to one or beyond. The yield of this lignin oil depends on the process conditions which are applied in the first stage. Parameters that influence the fuel properties of the oil, like viscosity, density and gross heating value (GHV) are controlled by the second step and the removal of the solvent. The use of non-catalytic subcritical process (≤200° C.) and mild residence times (≤240 min) in the first stage and finally the delivery of crude lignin oil (CLO-H) in 1:2 to 1:0.3 w/v ratio and specific kinematic viscosity @40° C. (between 50 and 200 cST, for example about 100 cST) are technical features of the present invention.

For methanol as a solvent, at ratios higher than 1:0.3 (which means less solvent relative to lignin), the lignin starts to separate out of the solution and a solid lignin can be obtained.

It is possible to perform a solvent exchange after the second step: a preferred solvent for preparing the CLO (for example ethanol or methanol) can be exchanged by a different polar solvent (for example phenol), by first adding the different polar solvent followed by (full or partial) evaporation of the preferred solvent.

In an embodiment the solid/liquid separation step is chosen from the group of filtration, centrifugation, decanting, settling, membranes, flash evaporation, or a combination thereof.

In an embodiment the liquid phase is subject to a separation step for further removing said polar organic solvent, wherein the separation step is chosen from the group of vacuum distillation, atmospheric distillation, rotary evaporation and flash evaporation.

In an embodiment the step of removing the polar organic solvent is continued until the ratio between the reaction lignin product and said polar organic solvent is in a range 1:2 and 1:0.3 for obtaining a product identified as heavy crude lignin oil (CLO-H). This ratio refers to the actual final amount of reaction lignin product solubilized in the polar solvent after the separation step.

In an embodiment the polar organic solvent removed is recycled to said treatment wherein said lignin-rich solid feedstock is contacted with said polar organic solvent under operating conditions.

Examples of the lignin-rich solid feedstock are based on lignocellulosic biomass feedstock pre-treatment processes, such as acidic pulping, alkaline pulping (either Kraft or Soda), Bergius-Rheinau process, steam explosion, organosolv pulping, (dilute) acid based hydrolysis, fraction processes based on lonic Liquids (ILs), liquid salts (e.g., zinc chloride hydrate) or Deep eutectic solvents (DES), superheated or supercritical steam.

The present invention relates to a medium crude lignin composition (CLO-M) comprising 8-30 wt. % of lignin and 70-92 wt. % of polar organic solvent, preferably between 10 and 30 wt. % lignin and 70-90 wt. % of polar organic solvent. The lignin in CLO-M preferably has a weight average molecular weight (Mw) in a range of 1000-2000 dalton with a polydispersity index in a range of 2.1-3. The CLO-M lignin composition preferably has a kinematic viscosity at a shear rate of 300 (1/s) @40° C. between 1.5 and 20, preferably between 1.8 and 10 (cST).

The CLO-M can contain different polar solvents. Preferably the polar organic solvent of the CLO-M is selected from ethanol and methanol. Preferably the amount of water in the CLO-M is less than 10 wt. %, more preferably less than 5 wt. %, less than 2 wt. %, relative to the CLO-M composition.

The removing of solvent in the second stage continues to a lignin product in organic solvent which is still soluble, and no precipitation of the lignin occurs. Typically the CLO-H contains between 30 and 80 wt. % of lignin, preferably between 50 and 75 wt. % of lignin.

The present invention therefore also relates to a lignin composition CLO-H comprising 30-80 wt. % of lignin and 20-70 wt. % organic solvent, preferably between 50 and 75 wt. % lignin and 25-50 wt. % organic solvent. The lignin in CLO-H preferably has a weight average molecular weight (Mw) in a range of 1000-2000 dalton with a polydispersity index in a range of 2.1-3. The lignin composition preferably has a kinematic viscosity at a shear rate of 300 (1/s) @ 40° C. between 20 and 200 cST, preferably between 50 and 150 or between 60 and 140 (cST).

The CLO-H can contain different polar solvents. Preferably the polar organic solvent of the CLO-H is selected from ethanol, methanol, diols, and phenol. Most preferably the polar organic solvent of the CLO-H is chosen from ethanol and methanol. Preferably the amount of water in the CLO-H is less than 10 wt. %, preferably less than 5 wt. %, or less than 2 wt. %, relative to the CLO-H composition.

In an embodiment the oxygen to carbon ratio (O:C ratio) of the lignin in the CLO-M and CLO-H lignin compositions obtained according the present method as discussed above is in a range of 0.25-0.45.

These and various other features as well as advantages which characterize the invention will be apparent from a reading of the following detailed description and a review of the appended claims.

BRIEF DESCRIPTION OF THE DRAWINGS

In order to more fully understand the manner in which the above-recited and other advantages and objects of the invention are obtained, a more particular description of the invention briefly described above will be rendered by reference to a specific embodiment thereof illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

In all Examples the 1:1 w/v ratio refers to the actual final amount of reaction lignin product suspended/dissolved in the polar solvent.

Example 1

Figure 1:
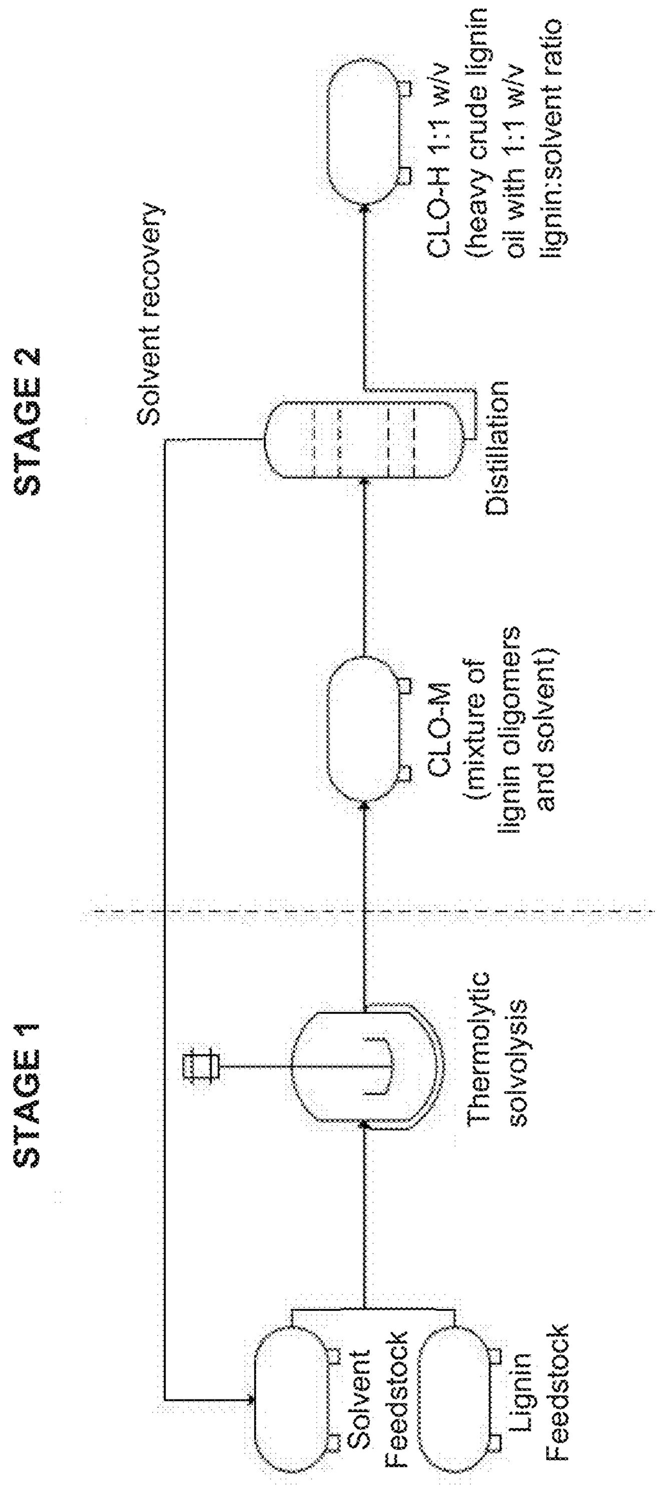
FIG. 1 is an example of a flow diagram of a two staged method for producing a stable 1:1 (w/v) lignin-to-ethanol CLO.

In the first stage of the present process, sulfur-free P1000 soda lignin feed material is subjected to a partially thermo-catalyzed depolymerization in the presence of a reaction medium, for example ethanol, via a mild solvolysis process. Lignin is converted to a suspension by simple dissolution in ethanol, in operating temperatures beneath 200° C., pressure beneath 50 bar and residence time up to 60 min. The solvolysis mixture is first subjected to a solid/liquid separation step such as filtration (2.7 μm) or centrifugation to separate insoluble solids. These solids typically comprise a mixture of char and undissolved lignin, depending on the operating temperature, and typically have considerable heating value as a solid fuel. Lignin is actually fractionated in ethanol and partially depolymerized to selectively produce low yields (≤5 wt. %) of C7-C10 alkylphenols and mostly higher molecular weight lignin oligomers. In the second stage of the present process, the liquid mixture of lignin and ethanol (CLO-M, FIG. 1) is subjected to an extra separation step, by removal of ethanol via vacuum distillation. Partially, ethanol is distilled from the mixture, until the final product (CLO-H) has approximately a 1:1 w/v lignin:ethanol ratio (production of CLO 1:1, FIG. 1). The amount of ethanol that is being removed is calculated in accordance with the amount of lignin that is suspended in the reaction mixture (first-step). Any further removal of solvent from the reaction mixture, is found that will cause precipitation of the suspended lignin and finally the separation of the two feed streams. The high purity distilled ethanol can be recycled back to the first stage of the process. The stable CLO-H 1:1 product can be used as a sulfur-free marine fuel as is, or as a chemical intermediate for further catalytic upgrade in a centralized location in a number of key organic compounds.

Example 2

Figure 2:
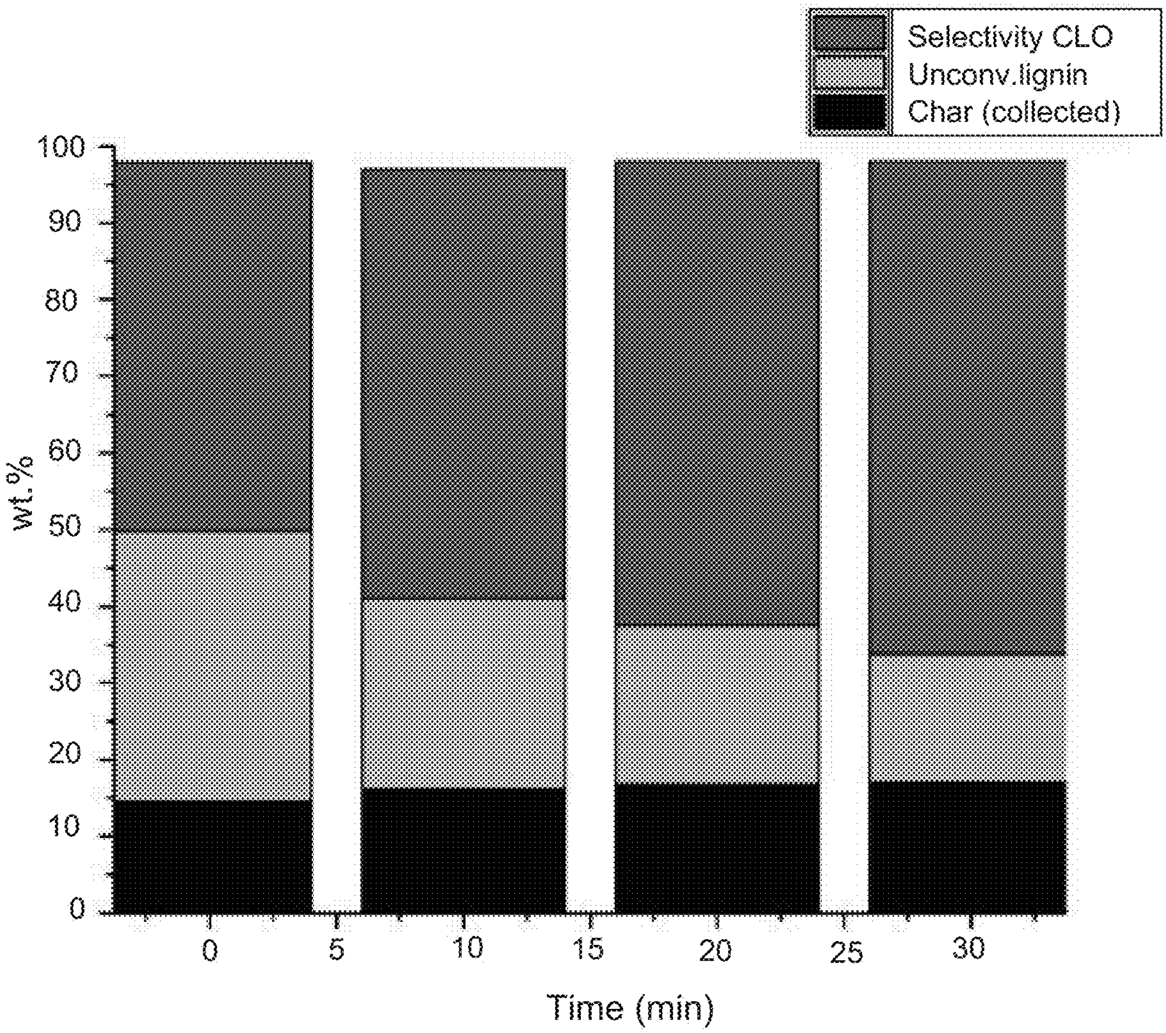
FIG. 2 shows the effect of shorter reaction times in product distribution (reaction conditions: 200° C., lignin-to-ethanol ratio 1:5 w/v).

Two cases from FIG. 2 (entries 6 & 7) were chosen in order to proceed with the production of a CLO-H 1:1 (g/ml). For both cases a 4 L batch autoclave reactor was used in order to execute the solvolytical depolymerisation of lignin (first-step). The chemical intermediate of this reaction is the CLO-M, a mixture of lignin and ethanol with ratio depending on the conversions obtained in the solvolysis step. Later, CLO-M was subjected to vacuum distillation, where partial removal of ethanol occurs. Distillation stopped at the point where lignin and ethanol were a stable suspension, and lignin did not precipitate. This critical point found to be close to 1:1 (g/ml) lignin-to-ethanol ratio. In FIG. 2, the mass balances of all streams are presented. The purity of the recovered ethanol was 99.6 wt. % while the ethanol losses in the process where 5-7 wt. %. The losses were due to condensation issues in the reactor tubing system. Blank experiments with ethanol only were performed and resulted on similar solvent losses.

Example 3

Sulfur-free P1000 soda lignin feed material is subjected to a thermolysis depolymerisation process in the presence of a reaction medium. 13.3 gr of lignin were added in a 100 ml batch reactor together with 40 ml of solvent (50/50 ethanol/methanol). The reactor was purged with $N_2$ and the pressure was set to 10 bar (Pc). The reaction temperature was set to 200° C., and the residence time was 30 min and the reaction pressure was 50 bar. After reaction, the reactor was cooled down to room temperature, within 30 min using an ice-bath. The solvolysis slurry mixture, was first subjected to a solid/liquid filtration step (2.7 μm filter paper) using a vacuum air filter pump. The solid residue is typically composed by char. The filtrate (CLO-M) is a liquid mixture of solvent and suspended lignin. The density of the CLO-M was experimentally measured and had the value of 0.8725 g/ml. The solid residue was found to be 5.9573 gr. In order to verify the lignin concentration in the CLO-M, 1 ml of sample was subjected to vacuum distillation. It was found that 0.22 gr of lignin were dissolved in 1 ml of CLO-M. The final volume of CLO-M was 34 ml and accordingly lignin conversion reached 56 wt. %. After knowing the exact lignin content of CLO-M and using the measured density of the mixture, the amount of solvent was calculated. In order to obtain a 1:1 w/v lignin:solvent ratio, 1 ml of solvent per 1 gr of lignin dissolved was required. Finally, 14.23 ml of solvent were removed from 33 ml of CLO-M with vacuum distillation, in order to end up with a heavy crude lignin oil suspension with 1:1 w/v ratio (CLO 1:1).

Example 4

The same procedure as Example 3 was followed except that Kraft lignin was used now as lignin feed material. 13.3 gr of lignin were added in a 100 ml batch reactor together with 40 ml of methanol. The reactor was purged with $N_2$ and the pressure was set to 10 bar (Pc). The reaction temperature was set to 200° C., the residence time was 30 min and the reaction pressure was 50 bar. After reaction, the reactor was cooled down to room temperature, within 30 min using an ice-bath. The solvolysis slurry mixture, was first subjected to a solid/liquid filtration step (2.7 μm filter paper) using a vacuum air filter pump. The solid residue is typically composed by char. The filtrate (CLO-M) is a liquid mixture of solvent and suspended lignin. The density of the CLO-M was experimentally measured and had the value of 0.8500 g/ml. In order to verify the lignin concentration in the CLO-M, 1 ml of sample was subjected to vacuum distillation. It was found that 0.16 gr of lignin were dissolved in 1 ml of CLO-M. The final volume of CLO-M was 34 ml and accordingly lignin conversion reached 40 wt. %. After knowing the exact lignin content of CLO-M and using the measured density of the mixture, the amount of solvent was calculated. In order to obtain a 1:1 w/v lignin:solvent ratio, 1 ml of solvent per 1 gr of lignin dissolved was required. Finally, 22.4 ml of methanol were removed from 34 ml of CLO-M with vacuum distillation in order to end up with a heavy crude lignin oil suspension with 1:1 w/v ratio (CLO 1:1).

Example 5

In this example enzymatic lignin (EL) from a furfural plant in China was used as lignin feed material. 100 gr of lignin were added in a 4000 ml batch reactor together with 500 ml of ethanol. The reactor was purged with $N_2$ and the pressure was set to 10 bar (Pc). The reaction temperature was set to 200° C., the residence time was 30 min and the reaction pressure was 55 bar. After reaction, the reactor was cooled down to room temperature, within 4 hours. The solvolysis slurry mixture, was first subjected to a solid/liquid filtration step (2.7 μm filter paper) using a vacuum air filter pump. The solid residue wet cake, was dried to remove any solvent left and weighted (31.92 gr). The filtrate (CLO-M) is a liquid mixture of solvent and suspended lignin. The density of the CLO-M was experimentally measured and had the value of 0.8335 g/ml. In order to verify the lignin concentration in the CLO-M, 10 ml of sample was subjected to vacuum distillation. It was found that 1.46 gr of lignin were dissolved in 10 ml of CLO-M. The final volume of CLO-M was 480 ml and accordingly lignin conversion reached 67.2 wt. %. After knowing the exact lignin content of CLO-M and using the measured density of the mixture, the amount of solvent was calculated. In order to obtain a 1:1 w/v lignin:solvent ratio, 1 ml of solvent per 1 gr of lignin dissolved was required. Finally, 329 ml of ethanol were removed from 470 ml of CLO-M with vacuum distillation in order to end up with a heavy crude lignin oil suspension with 1:1 w/v ratio (CLO 1:1).

The summary of the process conditions of examples 3-5 are shown in Table 1.

TABLE 1 summary of process conditions examples 3-5.

| Ex | Lignin type | Solvent | T (° C.)/ P (bar) | T (min) | Lignin:Solvent ratio | Lignin Conversion wt. % | CLO-M density (g/ml) | CLO 1:1 volume (ml) |
|---|---|---|---|---|---|---|---|---|
| 3 | P1000 | 50/50 ethanol/ methanol | 200/50 | 30 | 1:3 | 56 | 0.8725 | 14 |
| 4 | Kraft | Methanol | 200/50 | 30 | 1:3 | 40 | 0.8500 | 9 |
| 5 | Enzymatic | Ethanol | 200/55 | 30 | 1:5 | 67 | 0.8335 | 130 |

Example 6

Different experiments have been performed according to example 1, whereby the temperature, reaction time and lignin to ethanol ratio have been varied. The experiments are summarized in Table 2.

TABLE 2 summary of experiments performed in example 6.

| Entry — | Lignin:EtOH ratio (g/mL) | Temperature (° C.) | Time (h) | In (g L/g EtOH) | Lignin conversion (wt. %) | Liquid product CLO-M (ml) | Density CLO-M (g/ml) | Lignin in CLO-M (wt %) |
|---|---|---|---|---|---|---|---|---|
| 1 | 1:15 | 200 | 4 | 2.66/31.2 | 75 | 37.4 | 0.8198 | 7.5 |
| 2 | 1:15 | 200 | 2 | 2.66/31.2 | 73 | 37 | 0.8155 | 6.5 |
| 3 | 1:15 | 200 | 1 | 2.66/31.2 | 72.5 | 37.1 | 0.8139 | 6.1 |
| 4 | 1:15 | 200 | 0.5 | 2.66/31.2 | 72.5 | 37.4 | 0.8109 | 5.4 |
| 5 | 1:10 | 200 | 0.5 | 4/31.2 | 65 | 37.3 | 0.8201 | 7.6 |
| 6 | 1:5 | 200 | 0.5 | 8/31.2 | 56 | 37.2 | 0.8505 | 15 |
| 7 | 1:5 | 120 | 0.5 | 8/31.2 | 49.8 | 37.1 | 0.8380 | 12 |
| 8 | 1:5 | 100 | 0.5 | 8/31.2 | 49.2 | 36.8 | 0.8398 | 12.5 |

TABLE 2-continued

| summary of experiments performed in example 6. | | | | | | | | |
|---|---|---|---|---|---|---|---|---|
| Entry — | Lignin:EtOH ratio (g/mL) | Temperature (° C.) | Time (h) | In (g L/g EtOH) | Lignin conversion (wt. %) | Liquid product CLO-M (ml) | Density CLO-M (g/ml) | Lignin in CLO-M (wt %) |
| 9 | 1:5 | 50 | 0.5 | 8/31.2 | 34.9 | 37 | 0.8316 | 10.5 |
| 10 | 1:5 | 25 | 0.5 | 8/31.2 | 12.7 | 38 | 0.8005 | 2.9 |
| 11 | 1:2.5 | 200 | 0.5 | 16/31.2 | 42 | 36 | 0.8967 | 26.3 |
| 12 | 1:2 | 200 | 0.5 | 20/31.2 | 41 | 36.5 | 0.9146 | 30.7 |
| 13 | 1:1 | 200 | 0.5 | 31.2/31.2 | — | — | — | — |

Figure 3:
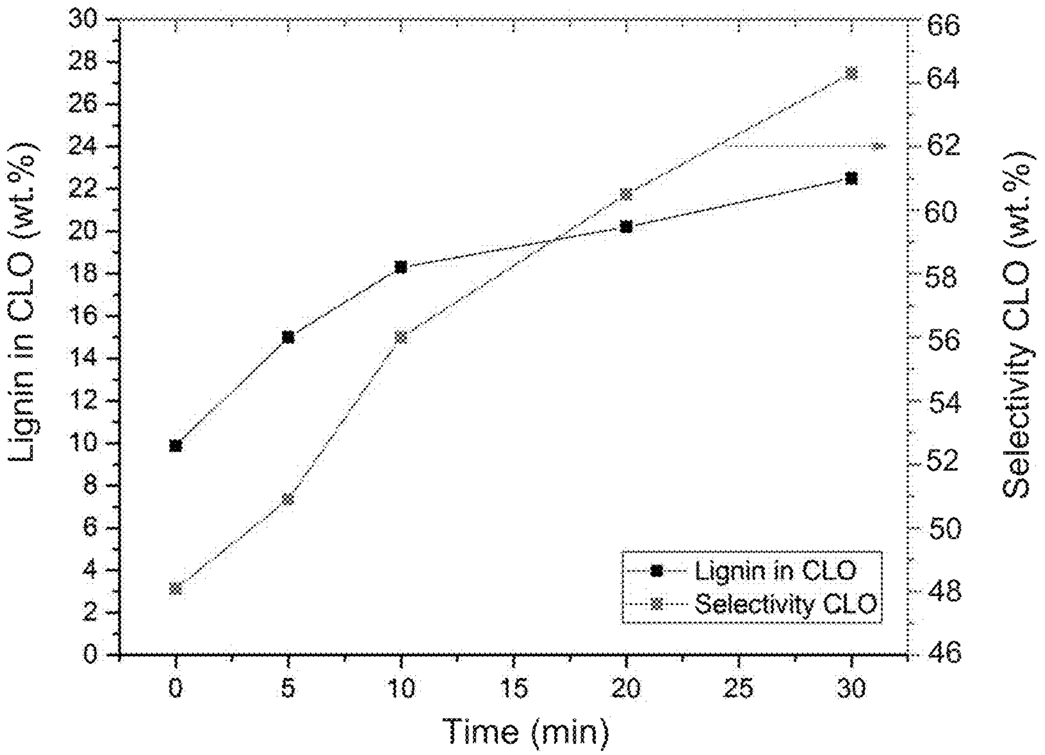
FIG. 3 shows the effect of shorter reaction times in CLO density and selectivity to CLO (reaction conditions: 200° C. lignin-to-ethanol ratio 1:5 w/v).

The effect of the shorter reaction times is shown in FIG. 2: at longer reaction time the conversion to CLO increases, but also char formation increases. FIG. 3 shows that the selectivity for CLO increases upon increase of the reaction time, and thereby also the density of the CLO increases.

Molecular weights of the experiments have been measured, and the result is summarized in Table 3.

TABLE 3

| total Average (PDA 254 nm) - Mw/Mn | | | | |
|---|---|---|---|---|
| Entry | # | Mn | Mw | Mw/Mn (PDI index) |
| | Soda Lignin P1000 | 531 | 1259 | 2.37 |
| 1 | 200 C._4 h_1:15 | 625 | 1674 | 2.68 |
| 2 | 200 C._2 h_1:15 | 579 | 1343 | 2.32 |
| 3 | 200 C._1 h_1:15 | 566 | 1334 | 2.36 |
| 4 | 200 C._30 min_1:15 | 538 | 1259 | 2.34 |
| 5 | 200 C._30 min_1:10 | 537 | 1229 | 2.29 |
| 6 | 200 C._30 min_1:5 | 560 | 1293 | 2.31 |
| 8 | 100 C._30 min_1:5 | 526 | 1120 | 2.13 |
| 9 | 50 C._30 min_1:5 | 472 | 1066 | 2.26 |

GPC analyses were performed by using a Shimadzu Prominence-I LC-2030C 3D apparatus equipped with two columns connected in series (Mixed-C and Mixed-D, polymer Laboratories) and a UV-Vis detector at 254 nm. The column was calibrated with Polystyrene standards. Analyses were carried out at 25° C. using THE as eluent with a flow rate of 1 ml/min. For the model compound analysis, an aliquot of 40 μl solution was taken from the reaction mixture followed by removing the solvent by blowing with air under room temperature. The sample was dissolved with 1 ml THF (the concentration is ~2 mg/ml). For the lignin residue analysis, the sample was prepared at a concentration of 2 mg/ml. All the samples were filtered using 0.45 μm filter membrane prior to injection. These procedures are in accordance with a publication of Emilie J. Siochi et al. in Macromolecules 1990, 23, 1420-1429.

Figure 9:
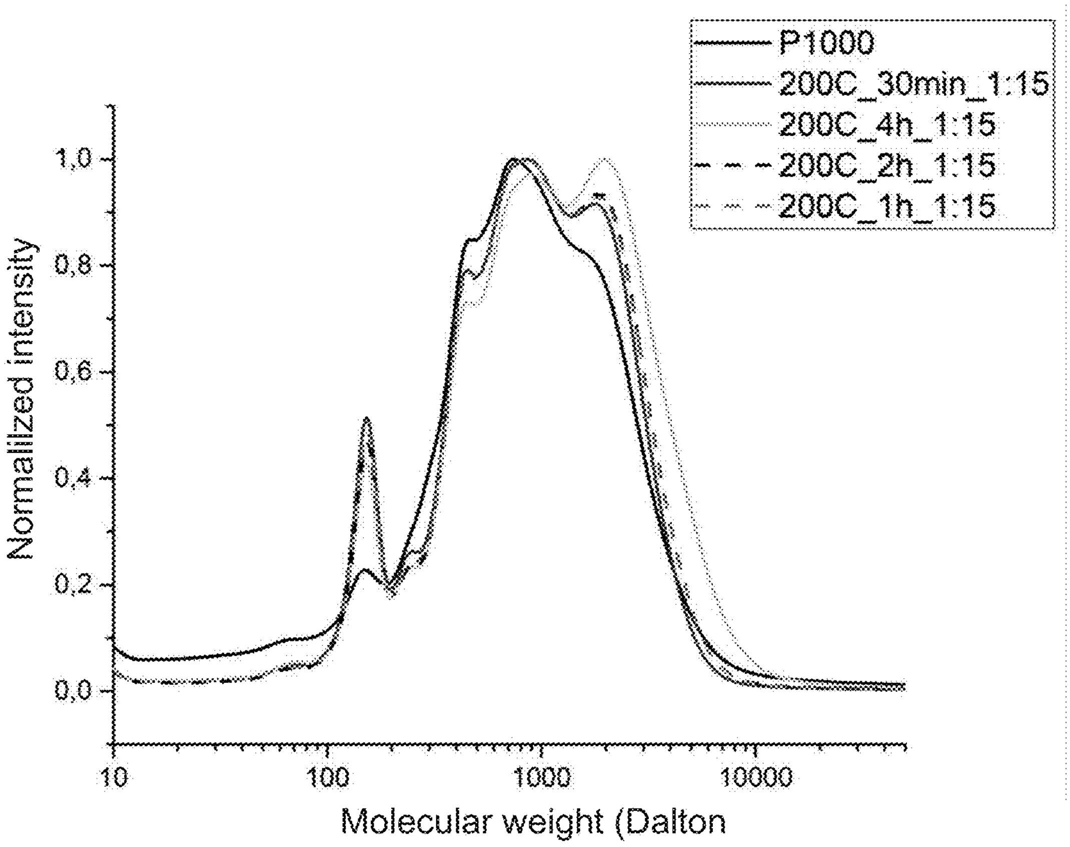
FIG. 9 shows a GPC curve of the solvolysis of lignin P1000 at 200 celc under different reaction times.
Figure 10:
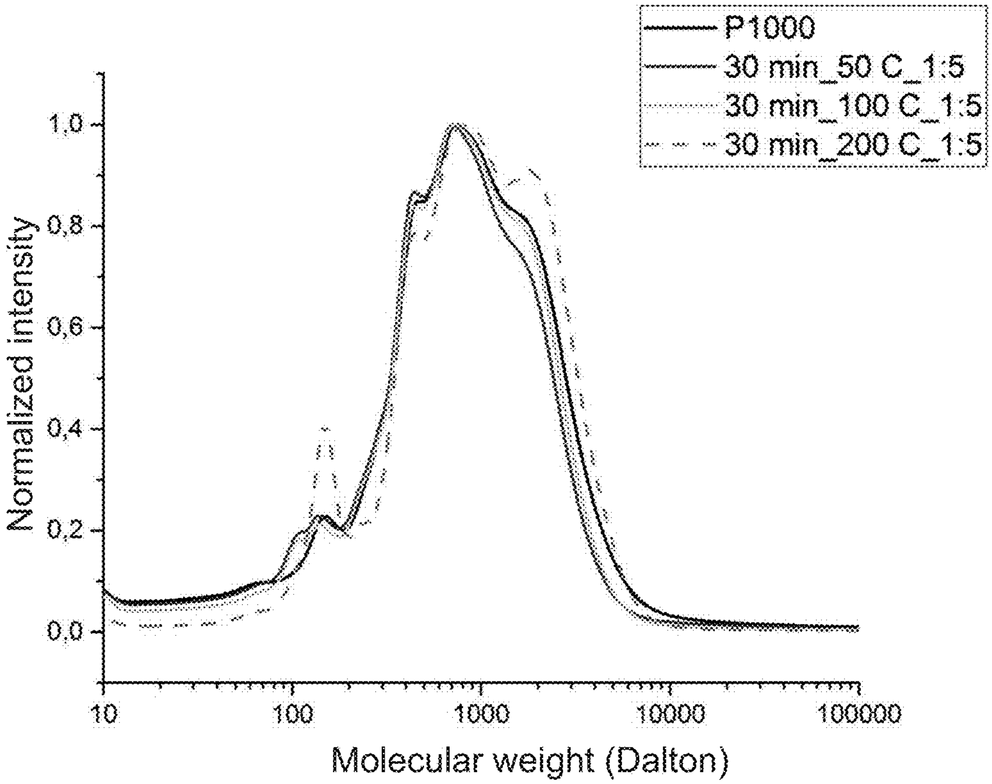
FIG. 10 shows a GPC curve of the solvolysis of lignin P1000 at different temperatures (50-100-200° C. under a reaction time of 30 minutes.
Figure 11:
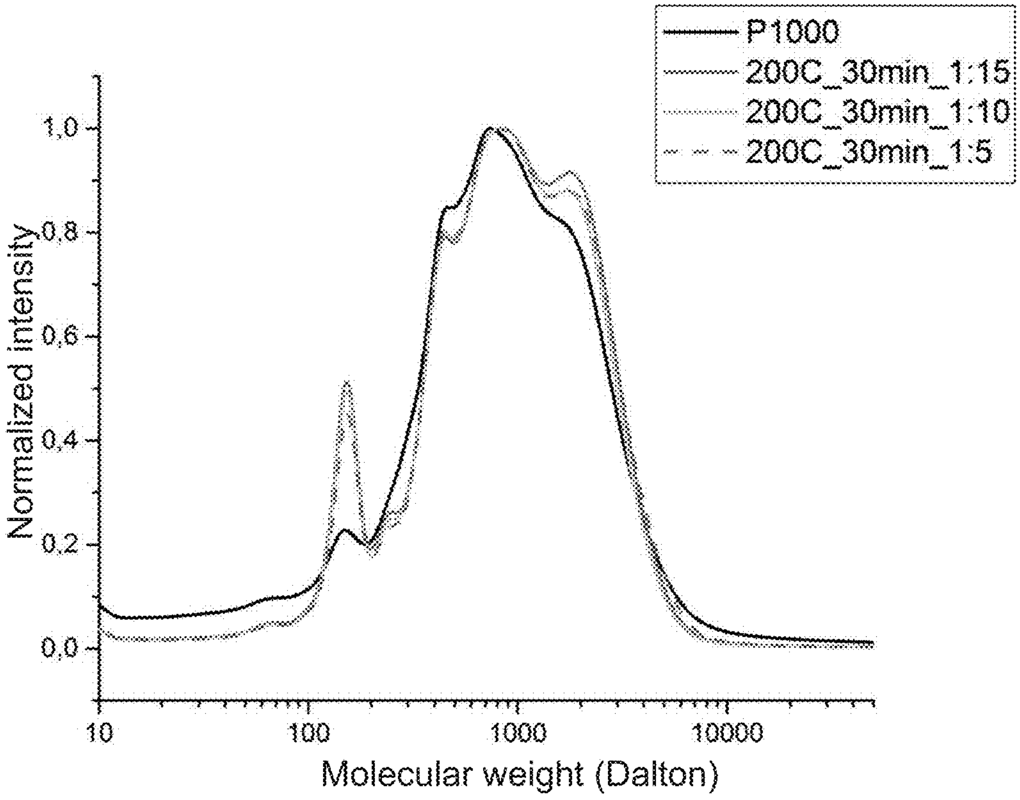
FIG. 11 shows a GPC curve of the solvolysis of lignin P1000 at different lignin:ethanol ratios (1:15, 1:10 and 1:5) at 200° C. and 30 minutes reaction time.

The GPC graphs are represented in FIGS. 9-11. It is clearly shown that the reaction time and temperature have an influence on the low molecular weight components and also the high molecular weight components. This differences will have an influence on the kinematic viscosity of the CLO-M and CLO-H.

Experiment 7

Additional experiments were performed in order to show the effect of reaction temperature on the conversion of lignin, formation of char and selectivity to CLO. For this reason solvolysis has been performed at 6 different temperatures: 100° C.-150° C.-200° C.-250° C.-300° C.-350° C.

For all the experiments the mass balance for lignin is presented together with the distribution of different products (undissolved lignin, char (collected/or fouling, and lignin converted to CLO-M).

We focus on two important parameters: the ethanol losses (which were also measured after every reaction) and the fouling effect. As Char (fouling) we consider the amount of char that was formed and was stacked to the reactor and the stirrer. As Char (collected) we consider the amount of char formed and that could be easily removed from the reactor without the need of scratching the reactor and the stirrer. As Undissolved lignin we consider the amount of lignin that could dissolve in THF after the filtration step. Both Char (collected) and Char (fouling) were THF-insoluble residues.

Figure 4:
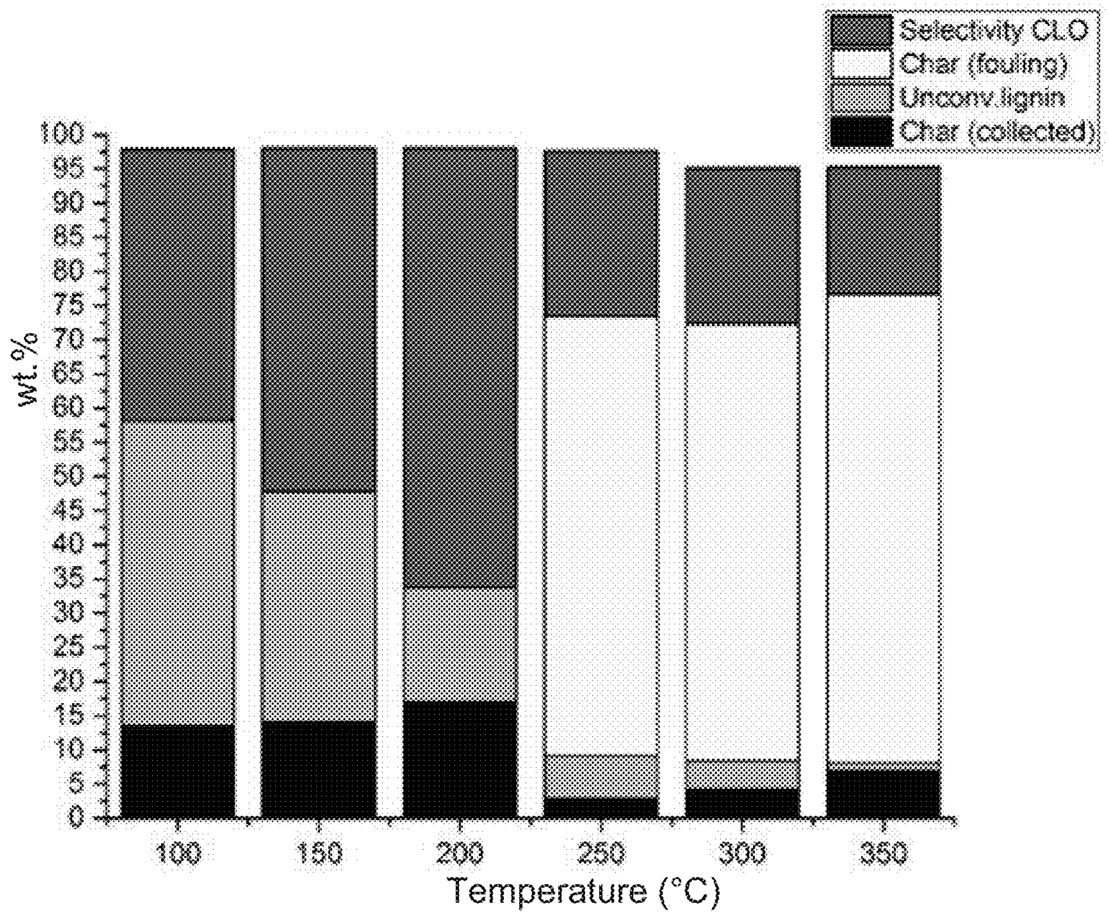
FIG. 4 shows the selectivity of the lignin solvolysis process as function of reaction temperature under the Experimental conditions: Lignin: ethanol feeding ratio (1:5 w/v), reaction time 30 min.

The results are presented in FIG. 4.

In FIG. 4 the effect of reaction temperature in the lignin conversion and product distribution is presented. Also in this graph we see the importance of low reaction temperatures when we shift from diluted feeding ratios to high lignin loadings. What we observe in this graph is that at low temperatures (<200° C.) we prevent any fouling issues in the reactor. At temperatures above 250° C. the formed char is causing fouling problems in the reactor and the stirrer, fact that makes the realization of a continuous process challenging. Also at high temperatures the selectivity to CLO is dropping dramatically. At low temperatures, we can achieve high conversion of lignin into CLO-M, preventing any fouling issues and being able to remove any char/unconverted lignin for downstream combustion process and energy generation purposes.

Figure 5:
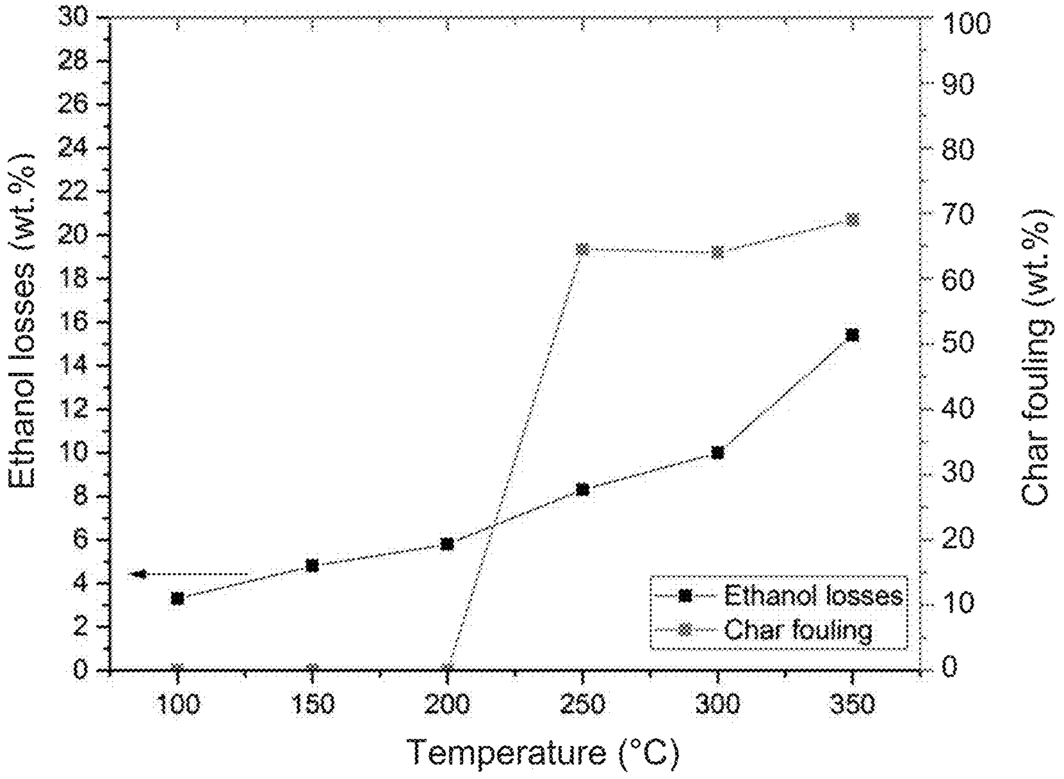
FIG. 5 shows the ethanol losses and char formation as function of the reaction temperature under the following experimental conditions: Lignin: ethanol feeding ratio (1:5 w/v), reaction time 30 min.

The effect of ethanol losses and reactor fouling in relation to operation temperature, are depicted in FIG. 5. The ethanol losses are remaining in reasonable and acceptable levels in temperatures up to 200° C., but at elevated temperatures solvent losses up to 15 wt. % were measured. The fouling effect is crucial at higher temperatures, reaching even values of 60-70 wt. %. These two issues, we are hoping to solve with our IP. Solvent consumption is the main component of variable costs in every commercial process.

Figure 6:
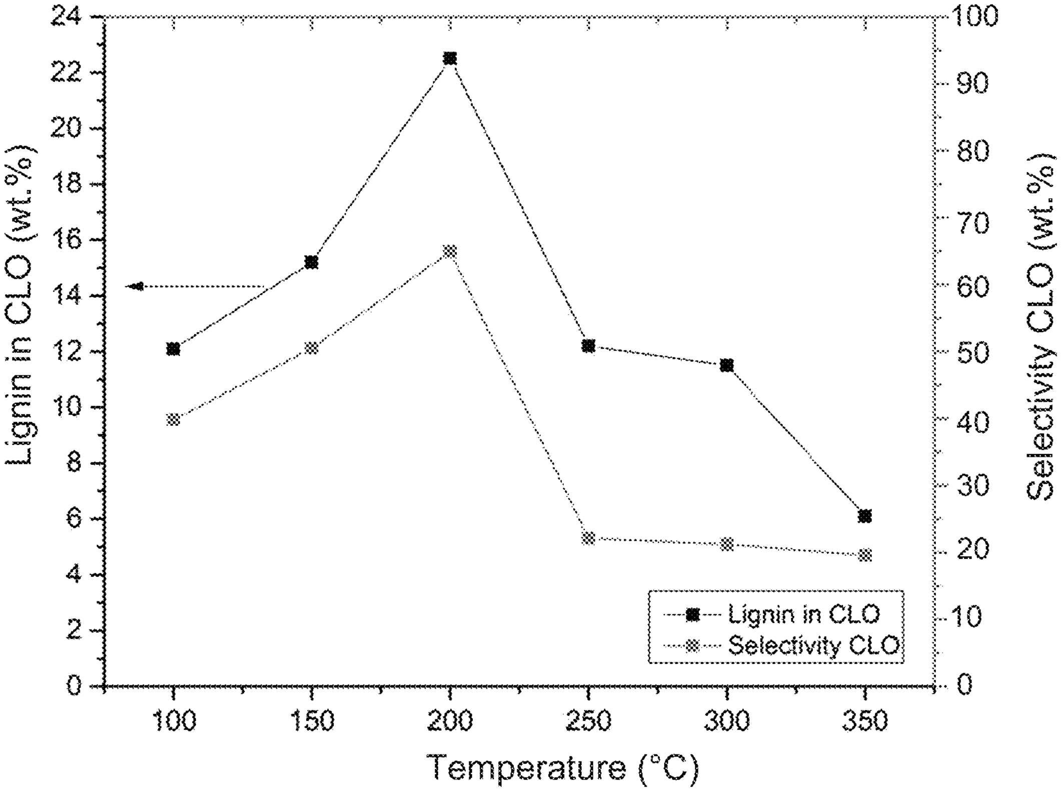
FIG. 6 shows the selectivity of the formation of CLO and density (concentration lignin in the CLO) as a function of reaction temperature under the experimental conditions: Lignin: ethanol feeding ratio (1:5 w/v), reaction time 30 min.

The trends of CLO density and selectivity to CLO in accordance with the operating temperature are presented in FIG. 6. The highest amount of lignin in the CLO (which is translated in density), for high lignin loadings, can be achieved at temperatures below 250° C. What is actually happening at high temperatures is that lignin is converted to char, causing fouling, which drops the selectivity to CLO. By maintaining low operating conditions, we can increase the yield of the CLO and at the same time ensure safe and efficient separation of the solid residue (char).

TABLE 4

| results of experiment 7 | | | | |
|---|---|---|---|---|
| Solvolysis Temperature (° C.) | Selectivity CLO (wt. %) | Unconv. Lignin (wt. %) | Char (collected) (wt. %) | Char (fouling) (wt. %) |
| 100 | 39.8 | 44.6 | 13.51 | 0 |
| 150 | 50.26 | 33.62 | 14.12 | 0 |
| 200 | 64.24 | 16.75 | 17.01 | 0 |
| 250 | 24.25 | 6.38 | 2.85 | 64.19 |
| 300 | 22.81 | 4.29 | 4.15 | 63.88 |
| 350 | 18.62 | 1.16 | 6.95 | 68.5 |

Experiment 8

Figure 7:
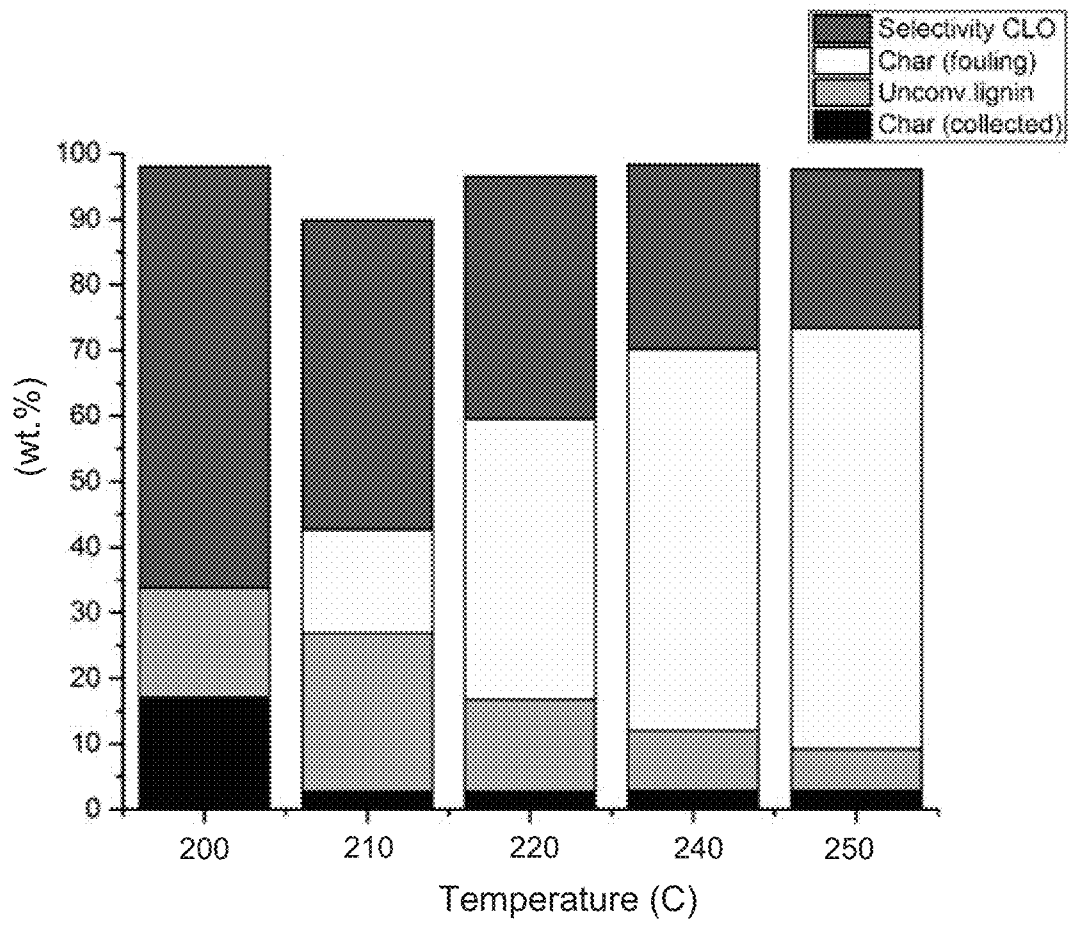
FIG. 7 shows the selectivity of the lignin solvolysis process as function of reaction temperature between 200 and 250° C. under the Experimental conditions: Lignin: ethanol feeding ratio (1:5 w/v), reaction time 30 min.

In experiment 7 we observed that in temperatures between 200 and 250° C., there is a sharp transition on the distribution of products, the lignin mass balances and the appearance of char (fouling) in the reactor and the decrease of selectivity to CLO. For that reason we decided to choose 3 more points in between in order to be able to understand this phenomenon. Three additional points were chosen (210, 220 and 240° C.) as it is shown in the FIG. 7. What we observe is that the reactor fouling due to char formation already starts to appear at 210° C., and continues to increase till 250° C. The conversion to CLO does not show any improvement during temperature rise, on the contrary, it starts slowly to decrease. In that case, at high lignin loadings, if we want to prevent any char fouling issues and at the same moment achieve high CLO yields, temperatures up to 200° C. should be chosen.

TABLE 5

| results experiment 8 | | | | |
|---|---|---|---|---|
| Solvolysis Temperature (° C.) | Selectivity CLO (wt. %) | Unconv. Lignin (wt. %) | Char (collected) (wt. %) | Char (fouling) (wt. %) |
| 200 | 64.24 | 16.75 | 17.01 | 0 |
| 210 | 47.27 | 24.25 | 2.68 | 15.7 |
| 220 | 37.05 | 14 | 2.77 | 42.73 |
| 240 | 28.14 | 9.14 | 2.91 | 58.14 |
| 250 | 24.25 | 6.38 | 2.85 | 64.19 |

Experiment 9

Figure 8:
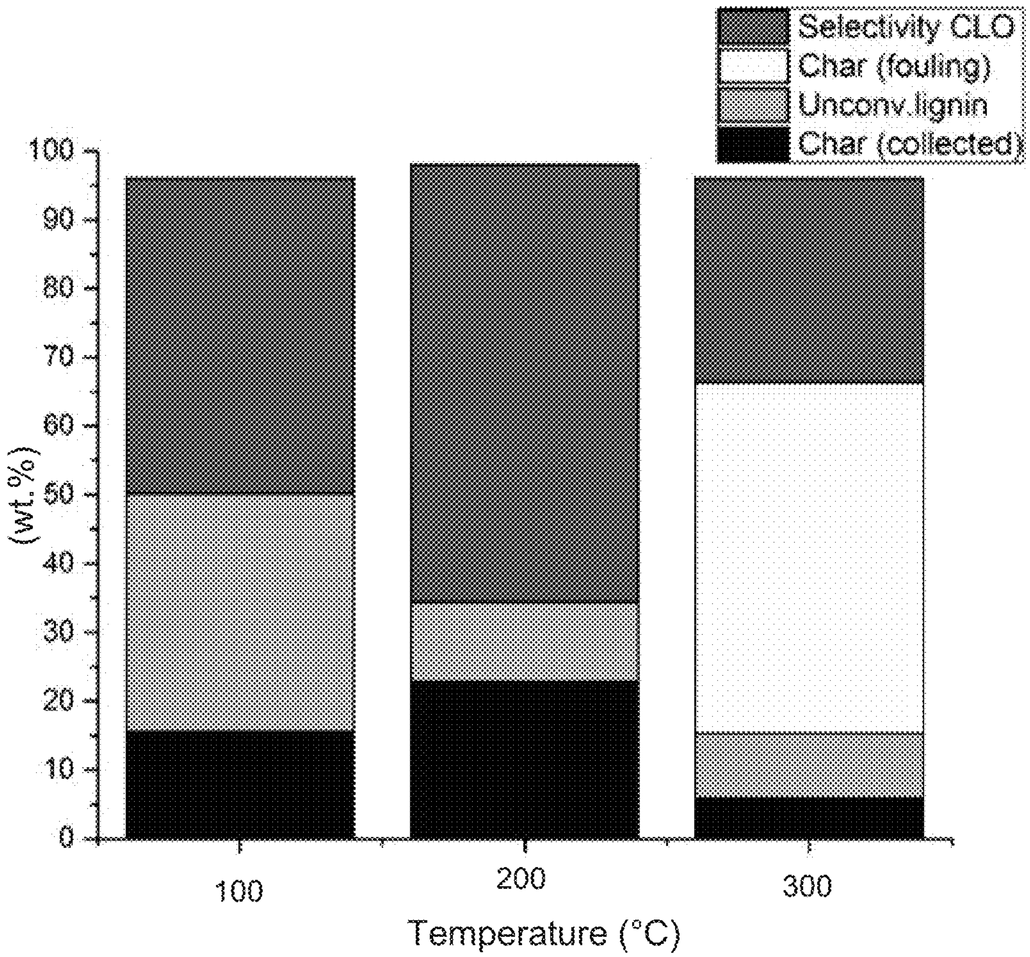
FIG. 8 shows the selectivity of the lignin solvolysis process as function of reaction temperature under (Experimental conditions) Lignin:methanol feeding ratio (1:5 w/v), reaction time 30 min.

In experiment 7, we performed several experiments with Ethanol as a solvent at different temperatures. In order to investigate the performance of methanol as a polar alcohol (cheaper solvent), we choose three temperatures (100, 200 & 300° C.) (see FIG. 8 for results).

In this example P1000 soda lignin was used as lignin feed material. 300 g of lignin were added in a 4000 ml batch reactor together with 1500 ml of methanol. The reactor was purged with $N_2$ and the pressure was set to 10 bar (Pc). The reaction temperature was set to 200° C., the residence time was 30 min and the reaction pressure was 55 bar. After reaction, the reactor was cooled down to room temperature, within 4 hours. The solvolysis slurry mixture, was first subjected to a solid/liquid filtration step (2.7 μm filter paper) using a vacuum air filter pump. The solid residue wet cake, was dried to remove any solvent. The filtrate (CLO-M) is a liquid mixture of solvent and suspended lignin to verify the lignin concentration in the CLO-M, 1 ml of sample was subjected to vacuum distillation. It was found that 0.1365 g of lignin were dissolved in 1 ml of CLO-M. The final volume of CLO-M was 1400 ml and accordingly lignin conversion reached 63.75 wt. %. After knowing the exact lignin content of CLO-M and using the measured density of the mixture, the amount of solvent was calculated. 1000 ml of CLO-M containing 136.5 gr of lignin, and based on the measured density, weighted 838 g. 838 g of CLO-M were subjected to vacuum distillation (40° C.), and 651 gr of methanol were recovered. Finally a heavy crude lignin oil suspension with 136.5 g of lignin and 47.77 g of methanol was obtained (CLO-H 1:0.35 w/w lignin:methanol).

Experiment 10

The kinematic viscosity has been determined of CLO-M and CLO-H blends in ethanol. * Viscosity measurements were performed, using the plate and cone technique, are conducted on a Physica MCR 302 rheometer at a temperature of 40° C.

The blends have been produced under different conditions: the first blend is produced at 120° C., the second blend at 200° C. results are summarized in Table 6.

TABLE 6

| Product | Solvolysis temperature (° C.) | Viscosity @40° C. (cST) |
|---|---|---|
| CLO-M | 120 | 1.9 |
| CLO-H (1:1) | 120 | 82 |
| CLO-M | 200 | 1.9 |
| CLO-H (1:1) | 200 | 95 |

Figure 12A:
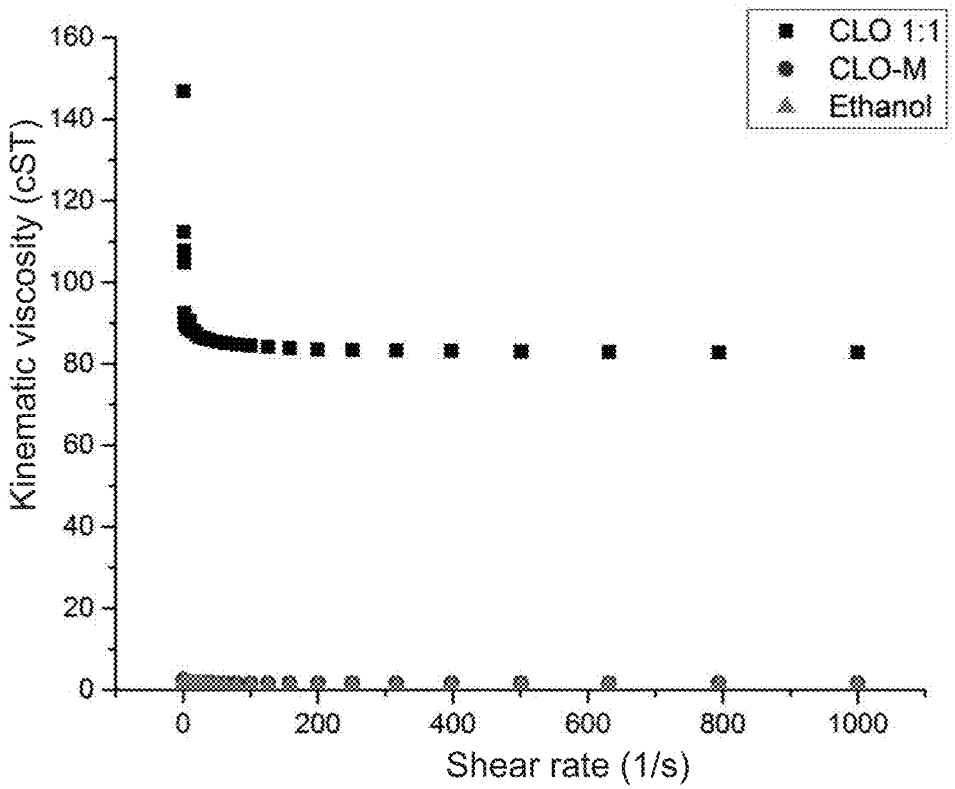
FIG. 12*a* shows the Kinematic viscosity (cST @40° C.) of CLO-M and CLO-H obtained from the reaction of lignin in ethanol at 120° C.
Figure 12B:
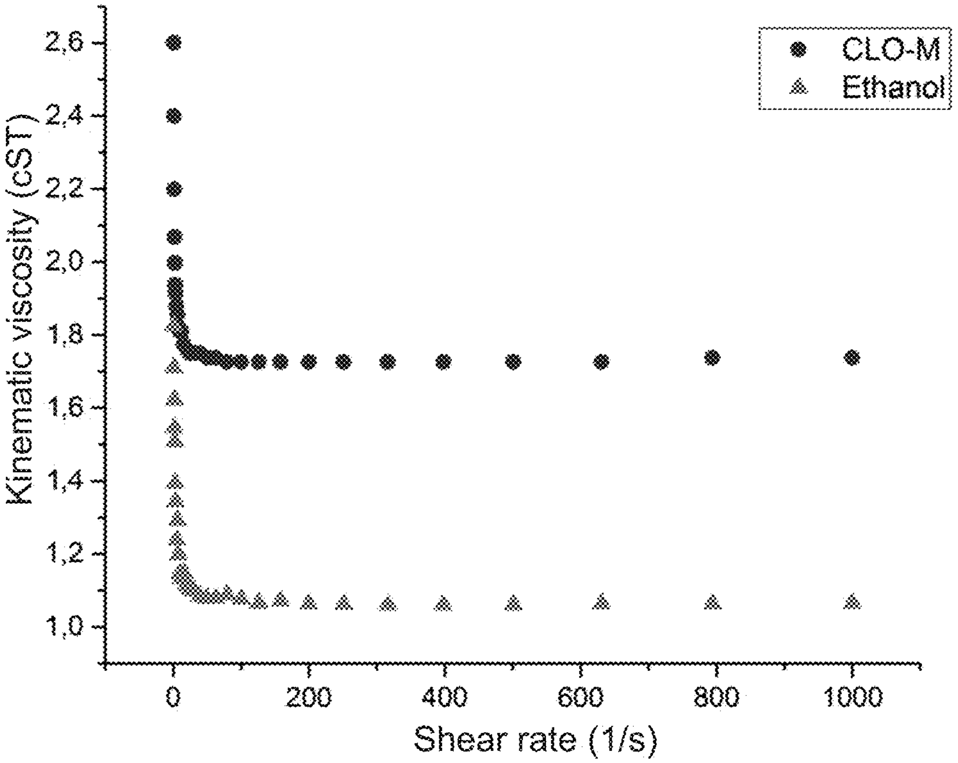
FIG. 12*b* shows the Kinematic viscosity (cST @40° C.) of CLO-M and ethanol from FIG. 12*a*.
Figure 13A:
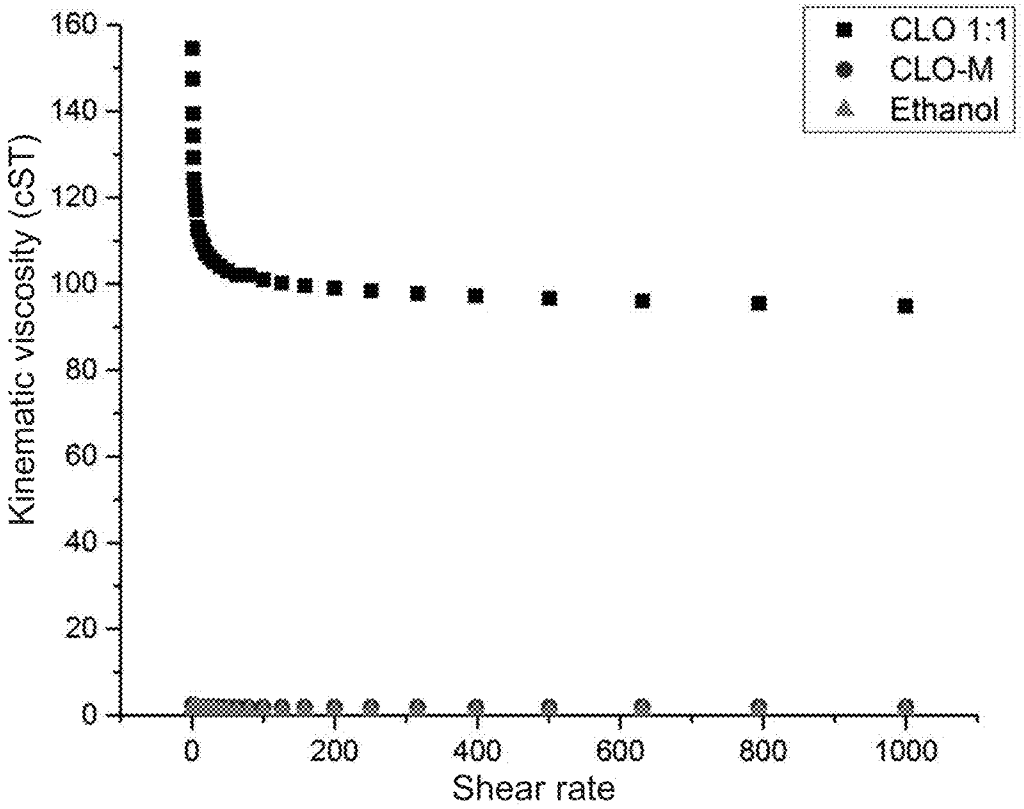
FIG. 13*a* shows the Kinematic viscosity (cST @40° C.) of CLO-M and CLO-H obtained from the reaction of lignin in ethanol at 200° C.
Figure 13B:
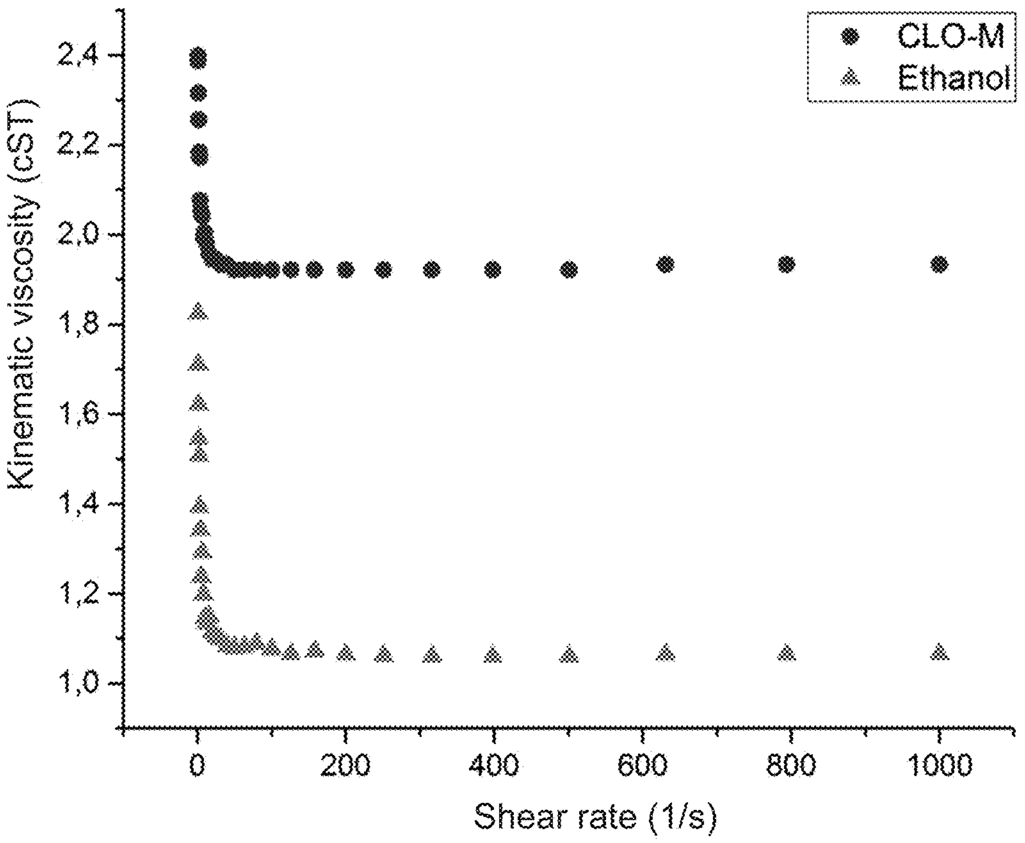
FIG. 13*b* shows the Kinematic viscosity (cST @40° C.) of CLO-M and ethanol obtained FIG. 13*a*.

FIGS. 12 and 13 give the respective results.

Experiment 11 how to Obtain a Phenolic CLO-M

In this example P1000 soda lignin was used as lignin feed material. 4 g of lignin were added in a 100 ml batch reactor together with 40 ml of phenol. The initial lignin:phenol feeding ratio was 1:10 w/v. Phenol is a solid in room temperature, thus it was heated first to 41° C. before it was subjected to the reactor. At 41° C. the density of phenol was 1.04 g/ml. The reactor was purged with $N_2$ and the pressure was set to 10 bar (Pc). The reaction temperature was set to 200° C., the residence time was 30 min and the reaction pressure was 40 bar. After reaction, the reactor was cooled down to 45° C., in order to keep phenol in a liquid form. Immediately, the solvolysis slurry mixture, was subjected to a solid/liquid filtration step (50 ml glass filter crucible por. 4/pore size 10-16 μm) using a vacuum air filter pump. During the filtration process the glass filter was continuously heated with a heat gun in order to maintain phenol in the liquid form. The filtrate (CLO-M) is a liquid mixture of solvent and suspended lignin. The final volume of CLO-M was 41 ml and the density of the phenolic CLO-M was 1.0822 g/ml at 41° C. The solid residue after filtration was 1.77 gr and accordingly the selectivity of lignin to CLO-M reached 22.85 wt. %. Finally, the phenolic CLO-M contained 6.08 wt. % of lignin fragments.

Experiment 12 how to Obtain a Phenolic Based CLO-H (by Swapping Phenol after Stage II of the Process).

In this example P1000 soda lignin was used as lignin feed material. 300 g of lignin were added in a 4000 ml batch reactor together with 1500 ml of methanol. The reactor was purged with $N_2$ and the pressure was set to 10 bar (Pc). The reaction temperature was set to 200° C., the residence time was 30 min and the reaction pressure was 55 bar. After reaction, the reactor was cooled down to room temperature, within 4 hours. The solvolysis slurry mixture, was first subjected to a solid/liquid filtration step (2.7 μm filter paper) using a vacuum air filter pump. The solid residue wet cake, was dried to remove any solvent. The filtrate (CLO-M) is a liquid mixture of solvent and suspended lignin. To verify the lignin concentration in the CLO-M, 1 ml of sample was subjected to vacuum distillation. It was found that 0.1365 g of lignin were dissolved in 1 ml of CLO-M. The final volume of CLO-M was 1400 ml and accordingly lignin conversion reached 63.75 wt. %. After knowing the exact lignin content of CLO-M and using the measured density of the mixture, the amount of solvent was calculated. 1000 ml of CLO-M containing 136.5 gr of lignin, and based on the measured density, weighted 838 g. 838 g of CLO-M were subjected to vacuum distillation (40° C.), and 651 gr of methanol were recovered. Finally a heavy crude lignin oil suspension with 136.5 g of lignin and 47.77 g of methanol was obtained (CLO-H 1:0.35 w/w lignin:methanol). 100 g of the latest CLO-H were transferred in a 250 ml round bottom flask, placed in a heating bath (45° C.) and mixed with 65 g of pure phenol. The solution was stirred for 30 min and then was subjected to vacuum distillation (50° C.). 31 g of pure methanol could be finally weighted and recovered from the solution, as it was verified with GCMS. The weight concentration of the new phenolic based CLO-H was 65 g of lignin fragments, 65 g of phenol and around 3-4 g of methanol.

What is claimed is:

1. A process for the production of a crude liquid lignin oil (CLO), comprising the steps of:

providing a lignin-rich solid feedstock and subjecting the lignin-rich solid feedstock to a treatment in a polar organic solvent in the absence of an effective amount of added reaction promoter, that is one or more of a heterogeneous catalyst, homogeneous catalyst, and hydrogen, and providing a lignin composition, said treatment comprises a step of contacting said lignin-rich solid feedstock with a polar organic solvent under operating conditions of an operating temperature ranges between 100-200° C., an operating pressure lower than 50 bar and a residence time up to 240 minutes, wherein the ratio (w/v) of lignin (in lignin-rich feedstock) to polar organic solvent ranges between 1:2 and 1:15 g/ml, wherein the polar organic solvent is methanol or ethanol or a combination thereof, and wherein lignin of the CLO produced by the process has a weight average molecular wight (Mw) of 1000-2000 daltons.

2. The process according to claim 1, wherein the ratio (w/v) of lignin (in lignin-rich feedstock) to polar organic solvent ranges between 1:2 and 1:10 g/ml.

3. The process according to claim 1, wherein the operating pressure ranges between 2-50 bar, and wherein the residence time ranges between 10-120 minutes.

4. The process according to claim 1, wherein the amount of water present is less than 15 wt. % of the sum of the lignin-rich solid feedstock and polar organic solvent.

5. The process according to claim 1, wherein the process contains a second stage, wherein the suspended lignin stream obtained from the previous step is subjected to a partial removal of the polar organic solvent from the mixture and optionally the solvent is replaced by another polar solvent having an oxygen atom.

6. The process according to claim 1, wherein the amount of water present is less than 10 wt. % of the sum of the lignin-rich solid feedstock and polar organic solvent.

7. The process according to claim 1, further comprising the step of utilizing the crude liquid lignin as a fuel or as a chemical component for downstream applications.

8. The process according to claim 7, wherein the operating temperature ranges between 140-200° C., wherein the ratio (w/v) of lignin (in lignin-rich feedstock) to polar organic solvent ranges between 1:2 and 1:5 g/ml, wherein the operating pressure ranges between 5-40 bar and wherein the residence time ranges between 20-90 minutes.

9. The process according to claim 8, wherein the operating temperature ranges between 160-199° C., and wherein the residence time ranges between 21 and 40 minutes.

10. A process for the production of a crude liquid lignin oil (CLO), comprising the steps of:

providing a lignin-rich solid feedstock and subjecting the lignin-rich solid feedstock to a treatment in a polar organic solvent in the absence of an effective amount of added reaction promoter, that is one or more of a heterogeneous catalyst, homogeneous catalyst, and hydrogen, and providing a lignin composition, said treatment comprises a step of contacting said lignin-rich solid feedstock with a polar organic solvent under operating conditions of an operating temperature up to 250° C., an operating pressure ranges between 2 and 50 bar and a residence time between 10 and 120 minutes, wherein the ratio (w/v) of lignin (in lignin-rich feedstock) to polar organic solvent ranges between 1:2 and 1:15 g/ml, and wherein the polar organic solvent is methanol or ethanol or a combination thereof, and wherein lignin of the CLO produced by the process has a weight average molecular wight (Mw) of 1000-2000 daltons.

11. A process for the production of a crude liquid lignin oil (CLO), comprising the steps of:

providing a lignin-rich solid feedstock and subjecting the lignin-rich solid feedstock to a treatment in a polar organic solvent in the absence of an effective amount of added reaction promoter, that is one or more of a heterogeneous catalyst, homogeneous catalyst, and hydrogen, and providing a lignin composition, said treatment comprises a step of contacting said lignin-rich solid feedstock with a polar organic solvent under operating conditions of an operating temperature ranges between 100-200° C., an operating pressure lower than 50 bar and a residence time up to 240 minutes, wherein the ratio (w/v) of lignin (in lignin-rich feedstock) to polar organic solvent ranges between 1:2 and 1:15 g/ml, and wherein the polar organic solvent is methanol, ethanol, t-butanol, i-butanol, phenol, methyl acetate, ethyl acetate, acetone or methyl ethyl ketone, or a combination thereof, and wherein lignin of the CLO produced by the process has a weight average molecular wight (Mw) of 1000-2000 daltons.

* * * * *